(12) United States Patent
Sorkin et al.

(10) Patent No.: US 6,484,036 B1
(45) Date of Patent: Nov. 19, 2002

(54) METHOD AND APPARATUS FOR SCHEDULING MOBILE AGENTS UTILIZING RAPID TWO-WAY COMMUNICATION

(75) Inventors: Gregory B. Sorkin, Pleasantville, NY (US); Mariusz A. Fus, Lexington, KY (US); Geraldine M. Preston, Apex, NC (US); Baruch M. Schieber, White Plains, NY (US); Mark O. Carey, III, Raleigh, NC (US); David P. Williamson, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/443,710

(22) Filed: Nov. 19, 1999

(51) Int. Cl.$^7$ ................................................ H04B 7/00
(52) U.S. Cl. ........................ 455/508; 455/418; 340/991
(58) Field of Search ............................. 455/3.05, 3.06, 455/521, 414, 418, 500, 507, 508, 956, 575, 66, 517, 502, 503; 340/989, 991

(56) References Cited

U.S. PATENT DOCUMENTS

| | | | |
|---|---|---|---|
| 3,644,883 A | * 2/1972 | Borman et al. | 340/23 |
| 5,751,245 A | * 5/1998 | Janky et al. | 340/993 |
| 5,790,974 A | * 8/1998 | Tognazzini | 701/204 |
| 6,034,621 A | * 3/2000 | Kaufman | 340/825.44 |
| 6,134,450 A | * 10/2000 | Nordeman | 455/507 |
| 6,308,044 B1 | * 10/2001 | Wright et al. | 455/66 |
| 6,308,061 B1 | * 10/2001 | Criss et al. | 455/418 |
| 6,326,918 B1 | * 12/2001 | Stewart | 340/686.1 |

* cited by examiner

Primary Examiner—Lee Nguyen
Assistant Examiner—Congvan Tran

(74) Attorney, Agent, or Firm—Ohlandt, Greeley, Ruggiero & Perle, LLP; Steven C. Kaufman, Esq.; IBM Corporation

(57) ABSTRACT

A system and a method is disclosed for scheduling mobile agents. The system includes a dispatcher and at least one data processor that embodies a scheduling engine. A transceiver is coupled to the dispatcher for performing two-way communication with mobile agents through mobile agent transceivers. The dispatcher is responsive to a reception of a message or signal that is transmitted from a mobile agent for entering the received signal into the scheduling engine. The scheduling engine is responsive to an occurrence of a triggering event and to signals received from mobile agents for recomputing a schedule of activities for a plurality of the mobile agents, and for causing information descriptive of the recomputed schedule to be selectively transmitted to none, one, or more than one of the mobile agents through the transceiver. The two-way communication can use radio devices capable of entering and displaying text messages. A signal transmitted from the mobile agent may include information for specifying, by example, that the mobile agent has arrived at the location of a next scheduled activity; or that the mobile agent has completed a scheduled activity; or that the mobile agent has failed to complete a scheduled activity; or that the mobile agent is extending a duration of a currently scheduled activity beyond the time scheduled for the termination of the current activity; or that the mobile agent lacks one or more resources needed to complete a current activity; or that the mobile agent lacks one or more skills needed to complete the current activity.

34 Claims, 2 Drawing Sheets

METHOD AND APPARATUS FOR SCHEDULING MOBILE AGENTS UTILIZING RAPID TWO-WAY COMMUNICATION

FIELD OF THE INVENTION

This invention relates to methods and apparatus for scheduling mobile personnel, such as travelling salesmen or repairmen that visit customer sites.

BACKGROUND OF THE INVENTION

There are many applications that require mobile personnel, also referred to herein as mobile agents, to visit a large number of different sites, which may change from day to day. As can be appreciated, the efficient scheduling of mobile agents has a significant impact on business costs. In particular, it is important to adapt to departures from plan caused by, for example, traffic congestion, by a repair job taking longer than expected, by a customer's cancellation of a job, or by the discovery that resources other than expected, such as different parts, are required to complete a repair job.

The scheduling of mobile agents is typically performed in advance, with little responsiveness to changing situations. While there are existing passive systems that track mobile agents, any adaptation to the tracking data is performed manually, if at all. For example, one manual approach is exemplified by limousine drivers, who stay in radio contact with a dispatcher who may reschedule them based on their reports. As can be realized, the conventional approaches to the scheduling of mobile agents are less than optimal.

OBJECTS AND ADVANTAGES OF THE INVENTION

It is a first object and advantage of this invention to provide an improved mobile agent scheduling procedure that overcomes the foregoing and other problems.

It is another object and advantage of this invention for dynamically and adaptively scheduling and rescheduling individual ones of mobile agents to individual ones of jobs.

SUMMARY OF THE INVENTION

The foregoing and other problems are overcome and the objects of the invention are realized by methods and apparatus in accordance with embodiments of this invention.

Disclosed is a system and a method for scheduling mobile agents. The system includes a dispatcher and at least one data processor that embodies a scheduling engine. A transceiver is coupled to the dispatcher for performing two-way communication with mobile agents through mobile agent transceivers. The dispatcher is responsive to a reception of a message or signal that is transmitted from a mobile agent for entering the received signal into the scheduling engine. The scheduling engine is responsive to an occurrence of a triggering event and to signals received from mobile agents for recomputing a schedule of activities for a plurality of the mobile agents, and for causing information descriptive of the recomputed schedule to be selectively transmitted to none, one, or more than one of the mobile agents through the transceiver.

The two-way communication can employ, for the mobile agents, radio transmission devices into which text messages may be entered, and upon which text messages may be displayed.

A signal transmitted from the mobile agent may include information for specifying, by example, that the mobile agent has arrived at the location of a next scheduled activity; or that the mobile agent has completed a scheduled activity; or that the mobile agent has failed to complete a scheduled activity; or that the mobile agent is extending a duration of a currently scheduled activity beyond the time scheduled for the termination of the current activity; or that the mobile agent lacks one or more resources needed to complete a current activity; or that the mobile agent lacks one or more skills needed to complete the current activity.

A message transmitted from the dispatcher may include information for specifying at least one of a location and nature of the mobile agent's next scheduled activity.

Preferably, a particular mobile agent is informed by the dispatcher of a next scheduled activity for that mobile agent on a "just-in-time" basis, that is, just prior to the time that the mobile agent requires the information pertaining to the next scheduled activity.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

The teachings of this invention relate generally to the scheduling of mobile agents. Mobile agents may be humans, for example travelling salesmen or repairmen that visit customer sites. Herein a mobile agent will be referred to for simplicity as "he", although mobile agents could be of either sex, and furthermore need not be human. By example, mobile agents could be embodied as repair vehicles, or as robots, etc.

More particularly, the teachings of this invention relate to an automated, dynamic rescheduling technique that incorporates rapid feedback from mobile agents, for example via handheld radio devices. In the examples given below the mobile agents are human workers, but it is possible that the mobile agents could be machines. In this case, and by example, a crew of cleaning machines could have their tasks reallocated if one machine breaks down, or if entry is restricted for some reason to a particular area that is scheduled to be cleaned, etc.

Figure 1:
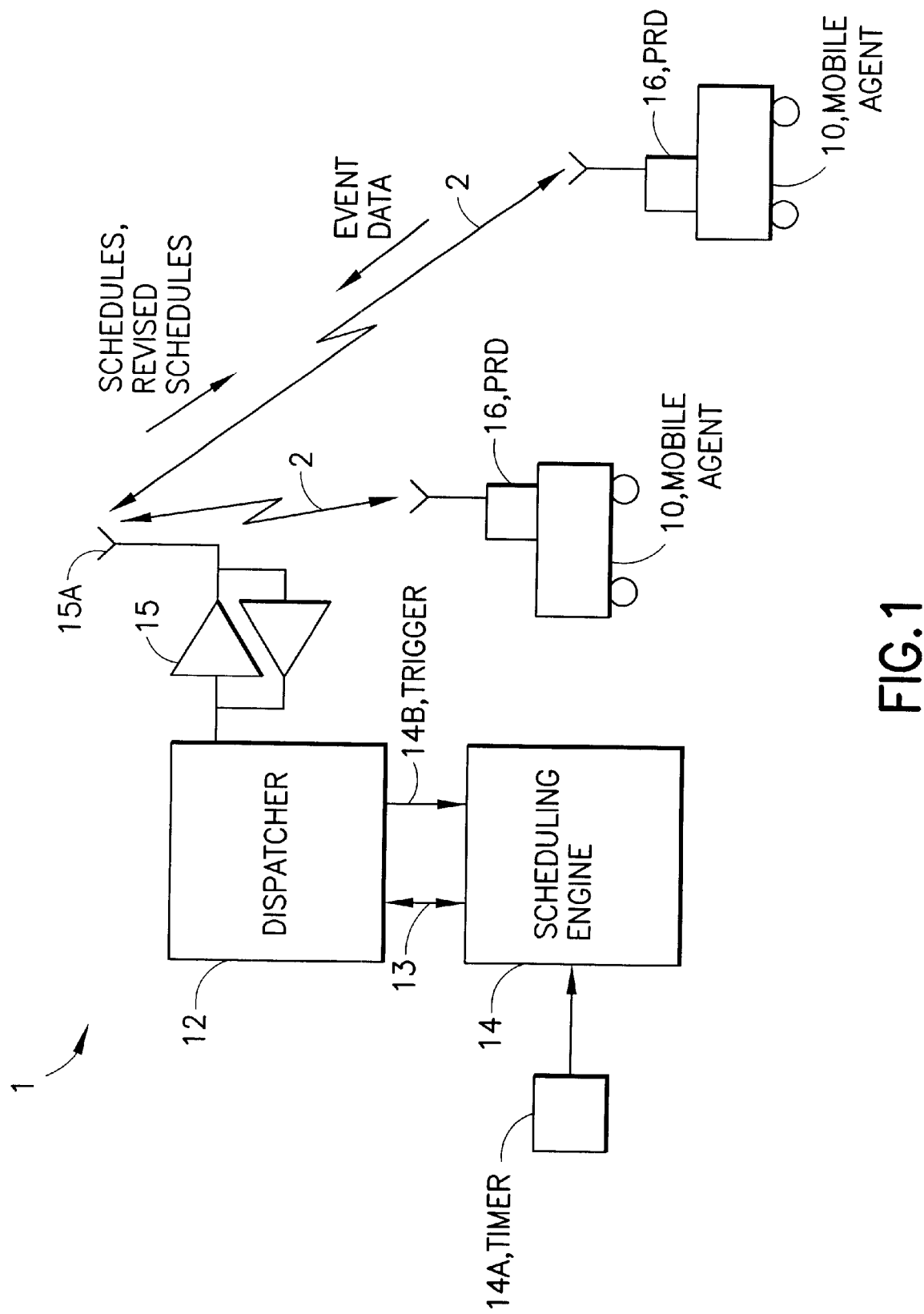
FIG. 1 is a block diagram of a dispatch and scheduling system that is constructed and operated in accordance with this invention for bidirectionally communicating with individual ones of a plurality of mobile agents.

Reference is now made to FIG. 1 for showing a block diagram of a dispatch and scheduling system 1 that is constructed and operated in accordance with this invention. The dispatch and scheduling system 1 provides bidirectional communications with individual ones of a plurality of mobile agents 10. In accordance with an aspect of this invention, there are one or more communications channels 2 between the mobile agents 10 and a dispatcher 12. The dispatcher 12 can be co-located with a scheduling site that includes a scheduling engine 14. The dispatcher 12 may be implemented in software running on a suitable computer, or it could be a function performed by a human operator. The communications channels 2 are made through a transmitter/receiver (transceiver) 15, which may be an RF signal transceiver operating in any suitable frequency band(s) through an antenna 15A. In a preferred implementation, each mobile agent 10 carries a portable radio device (PRD) 16 (e.g., sometimes referred to as a "brick") that is capable of sending alphanumeric data to, and receiving alphanumeric data from, the dispatcher 12 at the central scheduling site. In contrast to the conventional use of portable radio devices for simple tracking and dispatch purposes, in this invention real-time use is made of the information transmitted from the mobile agents 10 to the dispatcher 12.

For purposes of discussion the transmitter and receiver of the mobile agents 10 are treated as a single unit (transceiver), however they may be separate entities and may even use different communication channels. For example, a mobile agent's transmitter may be a special-purpose radio device transmitting a restricted set of formatted messages incorporating a minimal amount of text, while the receiver might be a conventional cellular telephone, wherein information is transmitted from the dispatcher 12 to the mobile agent 10 by means of computer-synthesized speech.

Whatever the particular form of the PRD 16, it is assumed that the transceiver 15 and antenna 15A of the dispatcher 12 are compatible in form and function.

In the embodiment discussed thus far the mobile agents 10 are alerted to, and act on, received data as soon as it arrives. In addition, the mobile agents 10 transmit data concerning prescribed events according to a prescribed protocol. For example, a mobile agent 10 may transmit an appropriate signal each time it arrives at a new job site, commences a job, completes a job, commences travel between jobs or between a job and a parts depot, picks up parts at a parts depot, begins lunch, finishes lunch, or finds that a particular job will take longer than predicted.

For each such event specified by the protocol, the mobile agents 10 transmit an appropriate signal in a standardized format. In a preferred implementation, and for example when a mobile agent 10 arrives at a customer site, the mobile agent 10 may simply send a signal of type (1), "on-site". If the mobile agent 10 finds that a job will take longer than expected, he may send a signal of type (2) "extend duration", which is optionally accompanied by a parameter for specifying the additional time required. As an example, an "extend duration <60>" signal indicates that the mobile agent 10 estimates that the job will require 60 minutes longer than the originally scheduled time for the job. In a preferred implementation, other standardized signals can include, but are not limited to: (3) that the mobile agent does not have parts required for the job; (4) that the mobile agent does not have a skill required for the job; or (5) that the job has been mis-diagnosed.

Each such signal transmitted by a mobile agent 10 induces or elicits a standardized response. For example, a "missing parts" signal, accompanied by a list of part numbers and quantities required, may be used to update the requirements for that particular job, along with an indication that the job is not complete and must be re-scheduled. An "extend duration" signal may be used by the scheduling engine 14 to revise an estimate of the sending mobile agent's next availability time.

In a preferred system implementation, these signals are automatically transmitted via the dispatcher 12 to the scheduling engine 14. The scheduling engine 14 is responsible for optimizing the schedules of a plurality of mobile agents 10. The scheduling engine 14 may re-compute a schedule upon one or more of a variety of triggering events. In a preferred embodiment the scheduling engine 14 re-computes a schedule at fixed intervals, for example every 15 minutes, as indicated by a programmable timer 14A. In another or the same embodiment the scheduling engine re-computes a schedule each time it receives a triggering event 14B, in this case a signal that a mobile agent has completed a job, or has extended the duration of a job, or has failed to complete a job.

In general, in this latter embodiment the triggering event 14B comprises a signal received from a mobile agent 10 via the dispatcher 12, where the signal is descriptive of a status (e.g., initiated, completed, not completable in a scheduled amount of time, not completable for a lack of a required resource or skill, etc.) of a scheduled activity that the particular mobile agent 10 has been scheduled to perform.

In a preferred implementation the scheduling engine 14 re-optimizes the schedule for individual ones of the plurality of mobile agents 10 at regular intervals, for example once every 15 minutes. In this case, data received from the mobile agents 10 is used to revise a set of constraints and desiderata with which the scheduling engine 14 is operating. In this context constraints may be viewed as "hard" constraints, which are either satisfied or violated in formulating a schedule, while desiderata may be considered more as "soft" constraints. For example, desiderata could be similar to the hard constraints of the violated/not violated type (it is allowed that a deadline be missed, but preferable that it be met), or they could be of a continuous type (e.g., minimize costs).

By example, a received "missing parts" signal, with a list of parts requirements, provides a constraint that these parts are required for a particular job, to which the scheduling engine 14 responds by attempting to reschedule the job at a time and to the same or a different mobile agent 10 so that the required parts will be available, and at a minimal cost. An "extend duration" signal provides a constraint that the sending mobile agent 10 will not be available until the revised estimated completion time, to which the scheduling engine 14 can respond by delaying this particular mobile agents' subsequent commitments, or assigning one or more of these pending commitments to another mobile agent 10, or by changing the schedule completely to optimally adapt to even a small change. Constraints and desiderata considered by the scheduling engine 14 may include the minimization of travel time between sites, limitations on the times that a job may be serviced (for example, based on a customer's hours of availability, or contractual obligations of service priority), the cost of obtaining parts by the time the job is scheduled, and so forth.

A presently preferred embodiment of such a scheduling engine 14 is described in copending patent application Ser. No. 09/444,333, filed on even date herewith, and entitled "Method and Apparatus for the Multi-Criteria Adaptive Scheduling of Mobile Agents", by G. Sorkin et al., the disclosure of which is incorporated by reference herein in its entirety.

In a preferred embodiment the mobile agents 10 are individually informed of their next activity by the dispatcher 12 on a "just in time" basis. For example, a mobile agent 10 may not be informed about his next job until he has completed the current job. By not committing an agent to future actions, maximum flexibility is preserved to reschedule jobs as circumstances evolve.

If the dispatcher 12 transmits only at fixed times, "synchronously" rather than "asynchronously", then the mobile agent may be informed of a next job at the last transmission time before a current job is scheduled to end.

For purposes of discussion, the dispatcher 12 and the scheduling engine 14 have been treated as separate entities, however they may be one and the same entity. The dispatcher 12 function is responsible for sending and receiving signals. The dispatcher 12 may be embodied, for example, in a computerized system which receives formatted messages from the mobile agents 10, along with one or more automated and/or human operators who may receive information from customers and mobile agents, and who enter this information into the dispatch system. The scheduling engine 14 is in charge of scheduling, and extracts relevant information (such as information about the mobile agents 10 and the jobs) from the dispatcher 12 over a bidirectional data path 13, and which returns relevant information (i.e., a schedule) to the dispatcher 12 over the data path 13.

It should be noted that it is within the scope of this invention to transmit unformatted messages from the mobile agents 10 to the dispatcher 12. In this case a human dispatcher is preferred for providing the relevant information to the scheduling engine 14.

It is also within the scope of this invention to transmit to the mobile agents 10 only when a change has occurred to that agent's schedule. For example, assume that the scheduling engine 14 and dispatcher 12 have cooperated to transmit that portion of mobile agent A's schedule that describes his next job. While on route to the next job the scheduling engine 14 performs a periodic recomputation of the schedule for mobile agent A. If no change to mobile agent A's schedule has occurred, then another transmission need not be made to mobile agent A.

Furthermore, while described thus far in the context of a narrow cast (point to point) transmission from the scheduling engine 14 to individual ones of the mobile agents 10, in some embodiments the scheduling information for all mobile agents could be broadcast to all mobile agents 10, with each being responsible for identifying his own scheduling information. Alternatively, the scheduling information for other mobile agents could be retained by each mobile agent, should there be any utility in a particular mobile agent being aware of the locations and schedules of the other mobile agents.

Figure 2:
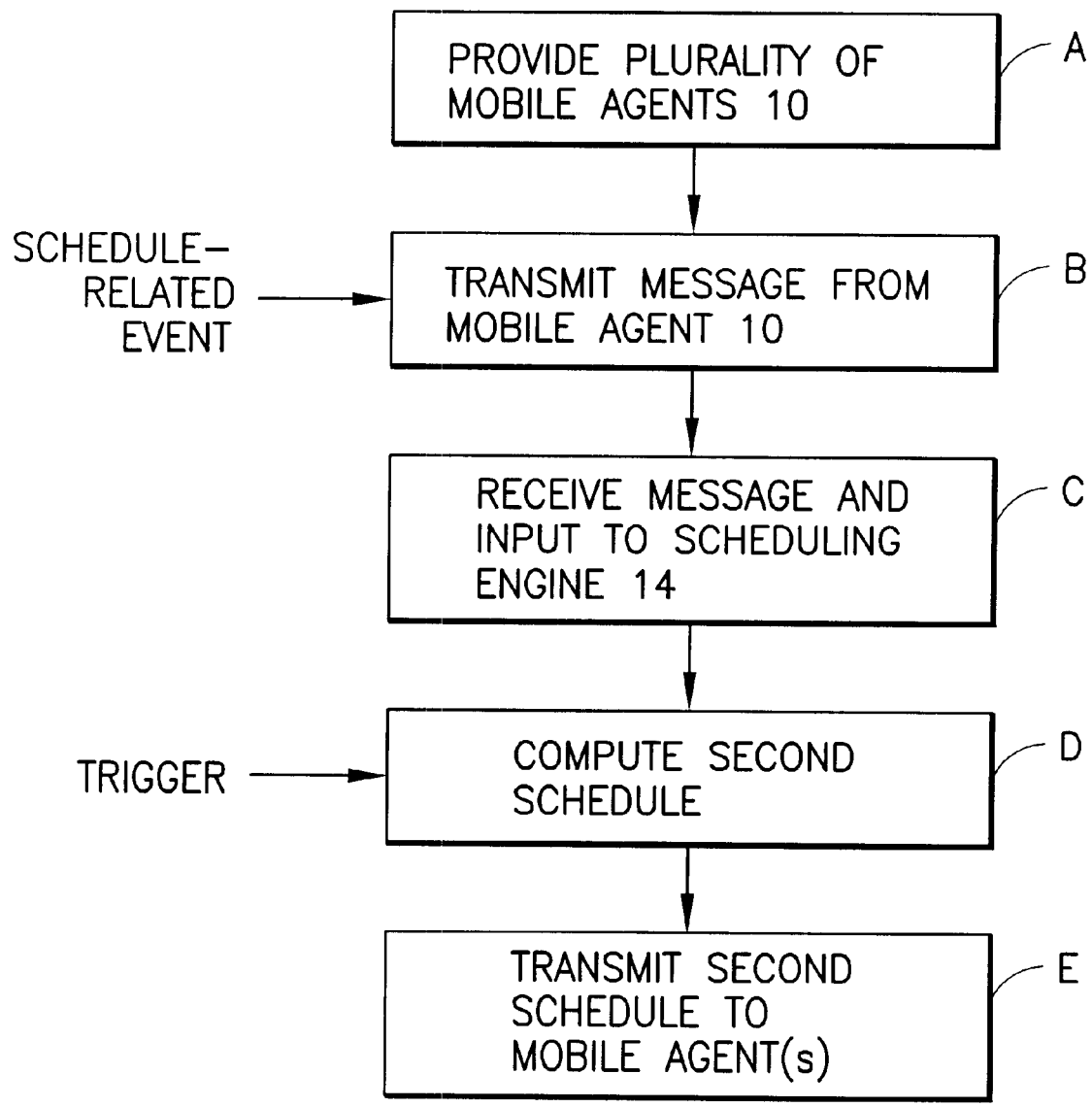
FIG. 2 is a logic flow diagram of a method that is implemented in the system of FIG. 1.

Based on the foregoing description, it can be appreciated that an aspect of this invention is the provision of a method for scheduling the mobile agents 10. Referring to FIG. 2, the method includes a first step (A) of providing a population (plurality) of the mobile agents 10, each of which operates in accordance with a first schedule. Another step (B) transmits, upon an occurrence of a schedule-related event, a message from a mobile agent 10. the message containing information for specifying a nature of the schedule-related event. A next step (C) receives the message and inputs the received message into the scheduling engine 14. Upon an occurrence of a triggering event, the scheduling engine 14 computes a second schedule that may or may not differ from the first schedule (Step D). The computation of the second schedule considers the information contained in the received message. A next step (E) selectively transmits the second schedule to one or more than one of the plurality of mobile agents, particularly if the second schedule differs from the first schedule. In some cases the second schedule may not be transmitted to any of the mobile agents, particularly if no significant change occurs to the schedule.

The message transmitted from the mobile agent preferably has a format that enables the message to include information for specifying that the mobile agent has arrived at the location of a next scheduled activity, or that the mobile agent has completed a scheduled activity, or that the mobile agent has failed to complete a scheduled activity, or that the mobile agent is extending a duration of the current activity beyond the time scheduled for the current activity, or that the mobile agent lacks one or more resources or skills needed to complete the activity.

In an automated-dispatcher embodiment the messages transmitted from the mobile agents 10 are transmitted in accordance with a pre-agreed upon protocol that enables the information of interest to be automatically extracted by either the dispatcher 12 or the scheduling engine 14. The protocol may be as simple or as complex as desired.

While the invention has been particularly shown and described with respect to preferred embodiments thereof, it will be understood by those skilled in the art that changes in form and details may be made therein without departing from the scope and spirit of the invention.

What is claimed is:

1. A system for scheduling mobile agents, said system comprising a dispatcher, at least one data processor that embodies a scheduling engine, and a transceiver coupled to said dispatcher for performing two-way communication with mobile agents through mobile agent transceivers, said dispatcher being responsive to a reception of a signal transmitted from a mobile agent for entering the received signal into said scheduling engine, said scheduling engine being responsive to an occurrence of a triggering event and to signals received from mobile agents for recomputing a schedule of activities for a plurality of mobile agents, and for causing information descriptive of the recomputed schedule to be selectively transmitted through said transceiver to none, one, or more than one mobile agent.

2. The system of claim 1, wherein received messages are automatically entered into said scheduling engine without human involvement.

3. The system of claim 1, wherein said triggering event is a function of time, so that said schedule is recomputed after a predetermined interval of time.

4. The system of claim 1, wherein said triggering event comprises the signal received from the mobile agent, the signal being descriptive of a status of an activity that the mobile agent was scheduled to perform.

5. The system of claim 1, wherein the signal transmitted from the mobile agent comprises information for specifying that the mobile agent has arrived at a location where a next scheduled activity is to be performed.

6. The system of claim 1, wherein the signal transmitted from the mobile agent comprises information for specifying that the mobile agent has completed a scheduled activity.

7. The system of claim 1, wherein the signal transmitted from the mobile agent comprises information for specifying that the mobile agent has failed to complete a scheduled activity.

8. The system of claim 1, wherein the signal transmitted from the mobile agent comprises information for specifying that the mobile agent will extend a duration of a current activity beyond a time scheduled for a completion of the current activity.

9. The system of claim 1, wherein the signal transmitted from the mobile agent comprises information for specifying that the mobile agent lacks one or more resources needed to complete a currently scheduled activity.

10. The system of claim 1, wherein the signal transmitted from the mobile agent comprises information for specifying that the mobile agent lacks one or more skills needed to complete a currently scheduled activity.

11. The system of claim 1, wherein the signal transmitted from the mobile agent comprises information for specifying at least one of a location and a nature of the mobile agent's next scheduled activity.

12. The system of claim 1, wherein said two-way communication is implemented using radio transmission devices into which text messages may be entered, and upon which text messages may be displayed.

13. The system of claim 1, wherein a mobile agent is informed of a next scheduled activity just prior to a scheduled start time of the scheduled activity.

14. A method for scheduling mobile agents, comprising steps of:
provinding a plurality of mobile agents individual ones of which operate in accordance with an associated first schedule;
upon an occurrence of a schedule-related event, transmitting a signal from a mobile agent, the signal comprising information for specifying a nature of the schedule-related event;
receiving the signal and inputting the signal into a scheduling engine;
upon an occurrence of a triggering event, computing a second schedule that may differ from the first schedule for the mobile agent, the computation of the second schedule considering the information that comprises the received signal; and
selectively transmitting the second schedule to none, one, or more than one mobile agent.

15. A method as in claim 14, wherein received signals are automatically inputted to the scheduling engine without human involvement.

16. A method as in claim 14, wherein the triggering event occurs at predetermined intervals of time.

17. A method as in claim 14, wherein the triggering event comprises the receipt of the signal from the mobile agent.

18. A method as in claim 14, wherein the signal transmitted from the mobile agent comprises information for specifying that the mobile agent has arrived at the location of a next scheduled activity.

19. A method as in claim 14, wherein the signal transmitted from the mobile agent comprises information for specifying that the mobile agent has completed a scheduled activity.

20. A method as in claim 14, wherein the signal transmitted from the mobile agent comprises information for specifying that the mobile agent has failed to complete a scheduled activity.

21. A method as in claim 14, wherein the signal transmitted from the mobile agent comprises information for specifying that the mobile agent is extending a duration of a current activity beyond a time scheduled for a completion of the current activity.

22. A method as in claim 14, wherein the signal transmitted from the mobile agent comprises information for specifying that the mobile agent lacks one or more resources needed to complete an activity.

23. A method as in claim 14, wherein the signal transmitted from the mobile agent comprises information for specifying that the mobile agent lacks one or more skills needed to complete an activity.

24. A method as in claim 14, wherein the second schedule includes information for specifying at least one of a location and a nature of a mobile agent's next scheduled activity.

25. A method as in claim 14, wherein two-way communication is implemented between the plurality of mobile stations and the scheduling engine using radio transmission devices into which text messages may be entered, and upon which text messages may be displayed.

26. A method as in claim 14, wherein a mobile agent is informed of a next scheduled activity just prior to a scheduled start time of the scheduled activity.

27. A method as in claim 14, wherein the step of transmitting the second schedule transmits the second schedule to all of the plurality of mobile agents.

28. A method as in claim 14, wherein the step of transmitting the second schedule transmits the second schedule on a just in time basis.

29. A method as in claim 14, wherein the step of transmitting the second schedule transmits the second schedule at periodic intervals so as to transmit the second schedule to a particular mobile agent just prior to a time that the particular mobile agent requires the second schedule.

30. The system of claim 1, wherein each of said plurality of mobile agents has a first associated schedule, and wherein said information descriptive of the recomputed schedule of activities is selectively transmitted to any of said plurality of mobile agents whose first associated schedule is affected thereby.

31. The system of claim 1, wherein each of said plurality of agents has a schedule, and wherein said recomputed schedule is optimized with respect to the schedules of said plurality of mobile agents.

32. A method as in claim 14, wherein said second schedule affects the associated schedule of first and second ones of said plurality of mobile agents, and wherein said second schedule, in whole or in part, is selectively transmitted to said first and second mobile agents.

33. A method as in claim 14, wherein information descriptive of the second schedule is selectively transmitted to any of said plurality of mobile agents whose associated first schedule is affected thereby.

34. A method as in claim 14, wherein said second schedule is optimized with respect to the associated schedules of said plurality of mobile agents.

\* \* \* \* \*